United States Patent [19]
Oxlade

[11] 3,776,587
[45] Dec. 4, 1973

[54] SURFACE VEHICLES WITH VENTURI ATTACHMENT

[76] Inventor: Kenneth David Oxlade, Lot 3, Knees Rd., Park Orchards, 3114 Australia

[22] Filed: Feb. 14, 1972

[21] Appl. No.: 225,905

[52] U.S. Cl. ................................................ 296/1 S
[51] Int. Cl. ............................................ B62d 37/02
[58] Field of Search ................... 296/1 S; 180/1 FS; 105/2 R, 2 A; 244/130

[56] References Cited
UNITED STATES PATENTS

| | | | |
|---|---|---|---|
| 2,719,053 | 9/1955 | McInnis | 296/1 S |
| 2,955,869 | 10/1960 | Blaser | 296/1 S |
| 3,425,741 | 2/1969 | Korff | 296/1 S |
| 3,618,998 | 11/1971 | Swauger | 296/1 S |

FOREIGN PATENTS OR APPLICATIONS

| | | | |
|---|---|---|---|
| 1,160,973 | 3/1958 | France | 296/1 S |
| 560,594 | 4/1957 | Italy | 296/1 S |
| 1,336,673 | 7/1963 | France | 296/1 S |

OTHER PUBLICATIONS

The Automobile Engineer, September 1928, Page 330.

*Primary Examiner*—Leo Friaglia
*Assistant Examiner*—Leslie J. Paperner
*Attorney*—D. Bruce Prout et al.

[57] ABSTRACT

An automobile or other surface vehicle having the underside thereof formed so as to define a venturi to thereby reduce the tendency of the vehicle to lift from the ground during movement; an attachment for fitting to a vehicle to define such a venturi.

6 Claims, 7 Drawing Figures

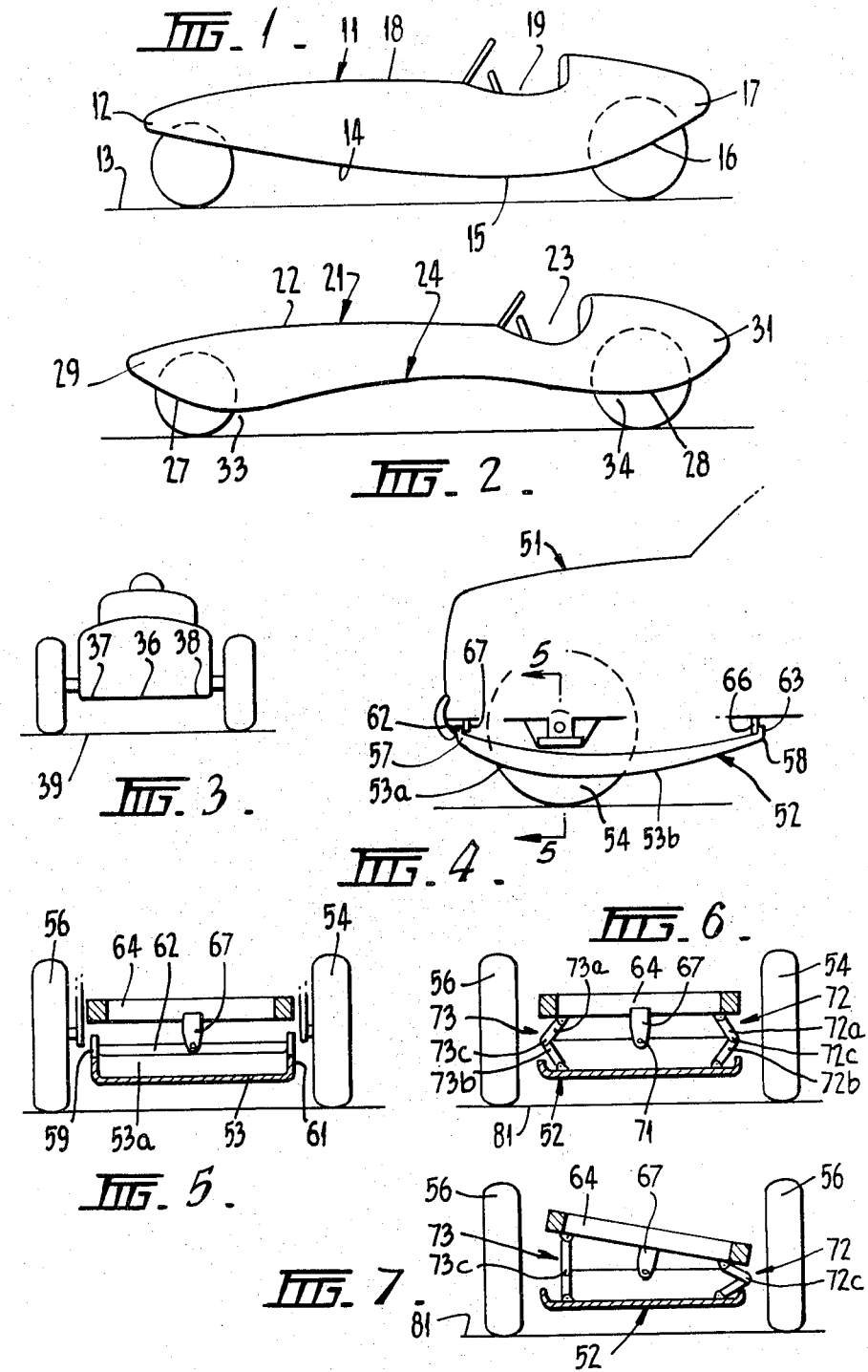

SURFACE VEHICLES WITH VENTURI ATTACHMENT

BACKGROUND OF THE INVENTION i. Field of the Invention

This invention relates to surface vehicles including self-propelled vehicles such as automobiles, and vehicles which are not self-propelled such as trailers and caravans.

ii. Description of the Prior Art

It is well known that surface vehicles, such as automobiles, travelling at high speeds tend to lift from the ground due to aerodynamic lift forces generated by air flowing over the vehicle as it moves. The lift is generated in a manner analogous to the generation of lift by an aircraft wing, the effective lifting force acting upwardly and slightly rearwardly at approximately the windscreen position in most automoblies. In addition to the lift force generated by this means, there is also a further force acting to lift the forward end of many vehicles, this being due to the torque applied by the driving wheels. That is to say, there is a tendency for the whole of the body of the vehicle to rotate about the rear axle in reaction to the driving torque of the wheels. There is thus also a tendency then for automobiles to assume an orientation, when moving, such that the body is upwardly inclined towards the forward end thereof, the angle of inclination increasing, due to increasing driving torque, as speed increases. Because of this greater inclination or "angle of attack," the effectiveness of the body as an aerodynamic force generator increases so that increase in speed of the vehicle results in a rapid rise in lift firstly because of the proportionality of the force to the square of the speed of the vehicle relative to the surrounding airmass, and secondly because of the increasing lift efficiency.

The result of the above effects, even if complete lifting does not occur, is disadvantageous in that the position of action of the lifting forces is such as to greatly decrease steering control by lessening the force holding the front wheels on the road surface; effective steering is of course dependent upon firm wheel to ground contact. This difficulty is particularly apparent in racing vehicles where it has been found necessary to adopt measures for maintaining the vehicles on the road during racing and to ensure that sufficient front wheel adherence is achieved. One common procedure is to add so-called "aerofoils" to the vehicles. These aerofoils comprise generally planar members disposed on the vehicle in a generally horizontal disposition. They are arranged to produce downward forces, that is forces in the opposite direction to the lifting forces normally produced by aeronautical "aerofoils." In recent times, such devices have been used quite extensively in professional racing, the aerofoils usually being provided one at the back of the driver and one to each side of the vehicle towards the front thereof.

The provision of aerofoils does to some extent assist in maintaining the vehicle on the road but they are not entirely satisfactory in use.

Firstly, it is necessary for them to be arranged at a negative angle of attack to the airflow resulting from the forward movement of the vehicle if they are to be effective. That is to say, the leading edges must be disposed at a lower point than the trailing edges. If the path of the vehicle were to be always horizontal, this angle would be maintained but in practice, since racing is often held over other than flat tracks, the angle of attack will vary due to pitching and, likewise, ordinary transportation vehicles do not invariably travel on well surfaced flat roads. The angle of attack could also vary because of any other induced forces acting on the vehicle. For example, the rear aerofoil is normally placed some distance above the vehicle in order to clear turbulence and thus, when the vehicle moves, the induced drag, being the horizontal component of angled upward lift, created by movement produces a turning moment acting about the axis of the rear wheels and constituting compound lifting of the front wheels.

It will be readily appreciated that because the normal angle of incidence to the horizontal for the aerofoil is relatively small, it does not require very much movement of the vehicle to produce a change in attitude sufficient to displace the aerofoil such that the desired angle of attack is not maintained, and variations in the downward force produced will result. For example, the angle of attack may reach a value such that the aerofoil instead of producing downward forces on the vehicle may even produce some degree of upward lifting. Particularly in racing, drivers usually attempt to press the road-holding ability of their vehicles to the limit and the unforseeable variations in this road-holding ability caused by varying effectiveness of an aerofoil is most undesirable, sometimes leading to disastrous consequences. In recent years greater negative angles have been used to offset some of these aspects but this causes greater drag forces.

Secondly, all aerofoils will induce drag forces which will vary in proportion to the square of the speed; it will be readily apparent that drag forces will often, at speed, be very considerable detracting from the performance of the vehicle. It may also be difficult with particular vehicles to arrive at an aerofoil configuration which offers sufficient effectiveness without causing excessive drag.

Another difficulty is that the area of an aerofoil which can be mounted on the vehicle, having due regard to the mechanical structure needed to mount it and the amount of drag induced by such structure and the aerofoil itself, is limited and it will not always be possible to provide a wholly satisfactory aerofoil on any particular vehicle. In any event, it is apparent that it is not very practicable to provide aerofoils of any size on automobiles for ordinary use, since they tend to obstruct clear vision of the driver and may present undesirable projections which could seriously injure pedestrians.

Again, because the structure which mounts the aerofoil on the vehicle is generally made as light as possible there is a danger of the aerofoil becoming dislodged and there have been several accounts of damage or injury, in racing, caused to drivers or spectators as a result of being struck by aerofoils loosened from vehicles because of inadequate mounting. This also mitigates against the use of aerofoils on vehicles intended for ordinary transportation purposes.

The invention provides improved means whereby a surface vehicle may be more adequately constrained against tendencies to lift from the road to thereby avoid, at least to some extent, the above-mentioned disadvantages associated with the use of aerofoils.

BRIEF SUMMARY OF THE INVENTION

According to the invention there is provided a surface vehicle characterised in that the under side thereof is constructed so as to define, in use of the vehicle, and between the under side of the vehicle, and the surface upon which the vehicle is travelling, a venturi.

BRIEF DESCRIPTION OF THE SEVERAL VIEWS OF THE DRAWING

The invention may be better understood from the following description which is to be read in conjunction with the accompanying drawings in which:

FIG. 1 is a diagrammatic side view of a vehicle constructed in accordance with the invention;

FIG. 2 is a diagrammatic view of another vehicle constructed in accordance with the invention;

FIG. 3 is a diagrammatic front view of the vehicle of FIG. 1 and that of FIG. 2;

FIG. 4 is a fragmentary, partly diagrammatic view of the front portion of a road vehicle fitted with an attachment constructed in accordance with the invention;

FIG. 5 is a cross-section on the line 5—5 in FIG. 4;

FIG. 6 is a view like FIG. 5 but showing a modification of the attachment, the attachment being shown under conditions prevailing during travel of the vehicle in a straight line; and FIG. 7 is a view corresponding to FIG. 6 but showing conditions during turning of the vehicle to the left thereof.

DETAILED DESCRIPTION

The vehicle 11 shown in FIG. 1 comprises a body 12, which in side elevation, is shaped generally in the form of an inverted wing section of an aircraft. The forward end 12 of the vehicle is spaced some distance above the ground line 13 and the forward underside portion 14 is positioned so as to extend downwardly and rearwardly to a minimum distance above the ground at a point 15 disposed towards the rear of the vehicle.

The distance of the point 15 above the ground is substantially less than the distance of the front portion 12 from the ground. The underside rear portion of the vehicle 16 extends upwardly and rearwardly to the rear end 17 so that the rear end 17 is disposed somewhat at the same level as the front portion 12.

The top 18 of the vehicle is substantially flat in this instance except that it is provided with a cockpit 19 for the driver. In use of the vehicle, and when it is driven forwardly, air flows underneath the vehicle and the under surface of the vehicle and the road surface together define a venturi so that air flow about the point 15 takes place at maximum speed and produces a local pressure reduction to produce a downward force tending to cause the vehicle to remain upon the ground.

The surface 14 may be arranged at an angle of approximately 15° to the surface 13 whilst the surface 16 may be arranged at an angle of approximately 7½° thereto. However, other angles between 5° and 30°, or even as much as 45°, for both surfaces will normally produce workable results, with angles between 10° and 20° most satisfactory. The angle of the forward surface is preferably approximately twice the angle of the rear surface.

In FIG. 2, the vehicle 21 has a generally flat upper surface 22 provided with a cockpit 23. The lower surface 24 is curved so as to define two portions 27, 28 disposed between the front end 29 and the rear end 31 of the vehicle. Portions 27, 28 are disposed relatively close to the ground so as to define two throats 33, 34 which, in use of the vehicle, produce low pressure areas under the vehicle in the same manner described in relation to FIG. 1. The low pressure areas result in the production of forces which act downwardly at these points.

It will be seen that the arrangement of the invention provides means whereby vehicles may be constructed in a manner such that they tend, in motion, to generate forces which keep them upon the ground. By appropriate shaping of the vehicle underside the centres of action of these forces may be arranged at any desired positions on the vehicle.

The height of the underside of the vehicle across the transverse width thereof is preferably substantially constant as is shown in FIG. 3, that is to say, with the centre longitudinally extending portions 36 thereof disposed substantially the same height above the road surface 37 as the outer longitudinal portions 37, 38. In some cases, it may be desirable to make the underside concave in transverse section.

In many cases, it is desirable to arrange the point of maximum downward force generation to coincide with the front end of the vehicle in order to act against the effect of upward lift as previously described.

Again, the point of maximum downward force may be arranged near the rear wheels to improve rear wheel grip and prevent "wheel spin" during acceleration.

FIGS. 4 and 5 show a vehicle 51 fitted with an attachment 52 which is secured to the underside of the vehicle between the front wheels 54 and 56 thereof.

Attachment 52 is formed of fibreglass or other relatively rigid material and presents a lower surface 53 which is flat in transverse cross-section (FIG. 5) but which has a downwardly curved portion 53a extending from a transverse leading edge 57, the portion 53a merging with a rear portion 53b which extends upwardly in the rearward direction of the surface 53 to a rear edge 58. The forward portion 53a of surface 53 extends downwardly at an angle of approximately 20° to the horizontal whilst the rear portion 53b extends upwardly at an angle of approximately 10°. The attachment has upwardly extending side flanges 59, 61 and upstanding front and rear flanges 62, 63. The rear flange 63 is secured at a point, intermediate its length, to a downwardly extending bracket 66 which extends below the chassis 64 of the vehicle. Likewise, the forward flange 62 is secured to chassis 64 by means of a bracket 67 on the underside of the vehicle.

The attachment 52 operates to produce a downward holding force in the same way as the force that is produced by the shaping of the underside of the vehicles of FIGS. 1 and 2. Edges 59, 61 assist in the maintaining of the pressure differential between upper and lower sides of the attachment to improve the efficiency of operation.

FIG. 6 shows an alternative method of mounting the attachment 52. In this case, the attachment 52 is secured to the chassis 64 by means of pivot pins 71 which extend through the brackets 66 and 67 and enter the front and rear flanges 62, 63. The axes of the pins 71 are coincident and extend generally longitudinally of the vehicle so that the attachment is pivotal about the common axis of the pins. The attachment is further interconnected, by means of a pair of link structures 72 and 73, to the chassis. These each comprise pairs of links 72a, 72b and 73a, 73b respectively. The links 72a and 73a are pivotally connected at upper ends to the underside of the chassis 64 for pivotal movement in a common plane transverse to the vehicle and intermediate the length of attachment 52 whilst the links 72b, 73b are pivotally connected at lower ends to opposite sides of the attachment for pivotal movement in the same plane. The free ends of the respective pairs of links 72a, 72b and 73 a, 73b are pivotally connected together by means of pins 72c and 73c respectively. The pivot pins 72c, 73c preferably provide mountings for weights (not shown) although the weight of the links and pins may in some cases be sufficient to permit operation in the manner hereinbefore described without the presence of such weights. By suitable selection of the weights or links and/or by the application of suitable resilient biasing means, the link structures 72 and 73 are arranged to be normally in the condition shown in FIG. 6, that is with the links pivoted outwardly of the pivot points on the chassis with the underside of attachment 52 maintained substantially parallel to the surface 81 on which the vehicle travels.

FIG. 7 illustrates the device secured as indicated in FIG. 6 when the vehicle is executing a left hand turn. It will be observed that, during this turn, the chassis 64 is tilted so that the right hand side is lower than the left hand side and there is an acceleration force directed to the right in FIG. 7 which acts upon the weights and pins 72c to cause right hand structure 72 to compress vertically that is to say the outward accelerative force on the weights on pins 72c causes the pins to be moved in the direction of the acceleration force thereby decreasing the obtuse angle between the two links 72a, 72b, and shortening the distance between the right hand underside of the vehicle and the attachment 52.

Likewise, the acceleration force acting upon link structure 73 operates to lengthen this by moving the pivot pin 73c inwardly as shown in FIG. 7, thereby increasing the distance between the left hand underside of the chassis and the attachment 52. The effect of the alteration in lengths of the link structures 72, 73 is to pivot the attachment 52 about its longitudinal pivot axis in such a manner as to at least substantially preserve the parallel relationship between the underside of the attachment 52 and surface 81, despite the rolling movement of the vehicle chassis. Thus, the effect on the attachment during turning is not altered to such an extent as would occur if it were fixed to the chassis and was thereby permitted to assume a transverse inclination to the surface 81. The result of this is to maintain the downward direction of the force generated by the attachment.

It will be appreciated that when the vehicle 51 is in motion, the road surface will inevitably cause the vehicle to pitch and the forward portion of the vehicle is thereby forced towards the road. During such downward pitching the attachment 52 is moved closer to the road surface, thus increasing the venturi effect produced thereby and thus also increasing the downward force generated by the attachment to retard, to some extent, the return movement of the front portion of the car. Thus the additional force generated acts in a manner tending to correct and dampen the sometimes violent and rather unsafe return of the front portion which would otherwise be produced by the car springs. Thus, lightening of the steering control which would otherwise occur is minimised.

The device when affixed as shown in FIGS. 4 and 5 operates to assist steering during turning of the vehicle on flat or banked turns and to reduce the tendency of the vehicle to steer "down" a slope which is being traversed laterally. For example, with automobiles having front wheels steerable, there is normally a tendency for the vehicle to "castor" down a slope which is inclined laterally of the vehicle. This tendency to "castor" down transverse slopes arises because there is a turning moment which, in plan view of the vehicle, acts sidewardly through the centre of gravity of the vehicle, about the rear wheels, the moment being proportional to the resolved component of weight down the slope. The lift force acts at right angles to the surface producing it, when considered in the lateral sense. A vehicle on a transverse slop has more weight placed on the "downhill" springs thereby tilting the vehicle out of parallel laterally with the slope. The lift force then is no longer at right angles to the road surface. Thus it will be readily appreciated that the resolved component of lift force, which acts upwardly upon the vehicle and now at a down-slope angle, also operates to assist this moment and a considerable force may need to be exerted by the driver to keep the vehicle properly on course on a cambered road when it is at some speed. Against this force, the attachment 52 when secured as shown in FIGS. 4 and 5 will generate an oppositely directed moment. This is due to the fact that the vehicle body tends to tilt about its longitudinal axis, owing to the resolved component of weight acting thereon, so that the side of the vehicle located on the "downhill" or inside of the projected turning circle due to "castoring" will be somewhat closer to the road surface than the "uphill" or outer side and the attachment 52, being rigidly secured to the vehicle, will thereby assume a disposition such that it is further disposed on its outer longitudinal edge from the ground than it is at the longitudinal inner edge.

The negative lift force generated by the attachment 52 will, of course, act at right angles to the attachment so that there will thus be a resolved component of this force which is directed outwardly of the projected turning circle and this causes a turning moment about the rear wheels which is directed outwardly of the steering circle. A vehicle fitted with the attachment 52 will thus, on cambered roads, have a tendency towards self-steering in that the attachment will generate a moment tending to restore the front wheels to a straight line orientation.

During turning on a flat road surface or on a banked turn taken at a speed greater than the "correct" speed, the body of an automobile tends to tilt outwardly on the turn rather than being balanced as on a properly banked turn taken at the appropriate speed so that there will be an acceleration force acting through the centre of gravity of the vehicle and directed outwardly of the turning circle thereby producing a moment tending to cause the front portion of the vehicle to move outwardly rather than inwardly of the turning circle. However, the outward tilt also alters the orientation of the attachment 52 (if it is rigidly secured to the vehicle) so that there will be a resolved component of negative lift force produced by the attachment and directed inwardly of the turning circle. Again, therefore, the attachment will produce a correcting moment which is directed against the outwardly directed moment acting upon the vehicle due to turning to thereby assist in the steering of the vehicle.

During cross winds, some degree of tilting of the vehicle about its longitudinal axis normally results and this will cause alteration of orientation of the attachment 52 to direct the negative lifting force in a direction such that there is a resolved component again tending to correct the effect of sideways vehicle castor due to the cross wind.

Furthermore, in wet weather the efficiency of operation of the device 52 or of vehicles constructed in accordance with the invention will be improved since it is well known that forces produced by venturi effect are dependent upon the density of the fluid medium and, in wet weather, the density will be increased due to increased moisture content in the air. This will be particularly apparent, of course, close to the road surface because of the greater proportion of water vapour there present.

It will be appreciated that the described embodiments of the invention have been described merely by way of explanation. In particular, although the disposition of the attachment 52 in the embodiments of FIGS. 4 to 7 is particularly advantageous it is not essential that this disposition be adopted. The arrangement could be such as to generate negative lifting force at any desired location on the vehicle. Likewise, the upturned side edges 59,61 could be dispensed with if desired. The underside of the attachment may, if desired, be lengthwise corrugated somewhat to improve strength, although at some small loss of efficiency. The method of mounting may, of course, be varied from that shown. The attachment could be secured at or adjacent the four corners thereof, or indeed, in any manner which does not interfere with the flow under the attachment. In the case where pivotal mounting is required, one pivot pin 71 and associated bracket 66 or 67 could be omitted. For example, the rear bracket could be omitted and the attachment held at the rear merely by the link structures 72, 73. The attachment could also be secured, directly or via a suitable linkage, to moving members of the vehicle suspension to achieve the required movement relative to the vehicle body. Again, although in the arrangement of FIGS. 6 and 7, the attachment 52 is arranged to rotate to maintain itself generally parallel to the road surface during turning, it may be desirable in some instances to arrange it such that it tilts to a considerable extent, to secure direction of the generated negative lift force as desired. This could be accomplished, for example, by orienting the link structures such that pins 72c, 73c are disposed inwardly rather than outwardly as shown, and thus increasing the self steering tendency at a small loss to wheel/road contact pressure, when applicable.

Means other than the link structures 72, 73 and the brackets may also be employed to ensure desired movement of the attachment relative to the vehicle. For example, the mass of the attachment itself, if pivotally suspended, will act as a pendulum and can be suitably interconnected to secure a desired movement of the attachment during roll of the vehicle.

Whilst the surfaces 14 and 16 are somewhat curved when viewed from the side, as is shown in FIG. 4, they may be straight (that is of constant incline throughout their lengths). The straight configuration is somewhat less satisfactory in use, but may be simpler to manufacture.

Whilst the invention is described primarily in relation to self propelled vehicles, it may, of course, equally be applied to towed vehicles such as caravans or trailers.

In all cases, the efficiency of the arrangement will of course depend upon the clearance between the lowermost part of the structure 52 and the ground. This clearance is preferably of the order of 6" but, if desired, a suitable mechanism may be employed to allow variation of this clearance, so as to allow it to be increased or decreased to provide for varying performance requirements. For example, a journey anticipated over winding roads may indicate a lower position for the device. Thus, greater influence, to control dangerous rolling by the vehicle, could be obtained by reducing clearance to 4".

Aside from the above variations, the configuration of the vehicles shown in FIGS. 1 and 2, or of the attachment of FIGS. 4 to 7, could be varied so that the underside is generally convex in transverse cross section.

I claim:

1. A surface vehicle having a body portion and means supporting the body portion for movement of the vehicle over a ground surface, said body portion having affixed thereto an attachment to assist in maintaining the vehicle upon said surface, said attachment comprising a member secured to the underside of the body portion and having a lower surface which extends downwardly from a forward edge thereof to a lower portion thereof and thence upwardly to a rear edge whereby to define, between the attachment and said surface, a venturi, said attachment being secured to the body portion for pivotal movement about a generally longitudinal and intermediate axis, and actuating means being provided for effecting tilting of the attachment about this axis and in the opposite sense to roll rotation of the vehicle body portion about its longitudinal axis produced during turning of the vehicle means for said effecting rotation comprising two pairs of links, one to either side of the vehicle, one link of each pair being pivotally connected to the underside of the vehicle to opposed lateral sides thereof and the other link of each pair being connected pivotally at one end to the free end of the associated link and at the other end pivotally to the attachment at the same lateral side thereof as the associated link is attached to the vehicle, said pairs of links being pivotal in generally transverse planes and being urged so that the connecting points between links of each pair are disposed outwardly of lines passing through the points of connection of the associated links to the vehicle and attachment.

2. A surface vehicle having a body portion and means supporting the body portion for movement of the vehicle over a ground surface, said body portion having affixed thereto an attachment to assist in maintaining the vehicle upon said surface, said attachment comprising a member secured to the underside of the body portion and having a lower surface which extends downwardly from a forward edge thereof to a lower portion thereof and thence upwardly to a rear edge whereby to define, between the attachment and said surface, a venturi, said attachment being secured to the body portion for pivotal movement about a generally longitudinal and intermediate axis, and actuating means being provided for effecting tilting of the attachment about this axis, and in the same sense as, but additional to, roll rotation of the vehicle body portion about its longitudinal axis produced during turning of the vehicle, said means for effecting rotation comprising two pairs of links, one to either side of the vehicle, one link of each pair being pivotally connected to the underside of the vehicle to opposed lateral sides thereof and the other link of each pair being connected pivotally at one end to the free end of the associated link and at the other end pivotally to the attachment at the same lateral side thereof as the associated link is attached to the vehicle, said pairs of links being pivotal in generally transverse planes and being urged so that the connecting points between links of each pair are disposed inwardly of lines passing through the points of connection of the associated links to the vehicle and attachment.

3. A surface vehicle having a body portion and means supporting the body portion for movement of the vehicle over a ground surface, said body portion having affixed thereto an attachment to assist in maintaining the vehicle upon said surface, said attachment comprising a member secured to the underside of the body portion and having a lower surface which extends downwardly from a forward edge thereof to a lower portion thereof and thence upwardly to a rear edge whereby to define, between the attachment and said surface, a venturi, said attachment being pivotally secured at a forward portion thereof to the vehicle body portion and rearwardly secured to moving members of the vehicle suspension mechanism thereby to cause rotation of the attachment generally about the longitudinal axis of the vehicle during roll of the body portion produced during turning of the vehicle.

4. A surface vehicle having a body portion and means supporting the body portion for movement over a ground surface, said body portion having affixed thereto an attachment to assist in maintaining the vehicle upon said surface, said attachment comprising a member secured to the underside of the body portion and having a lower surface which extends downwardly from a forward edge thereof to a lower portion thereof and thence upwardly to a rear edge to define, between the attachment and said ground surface, a venturi, said attachment being secured to said body portion for pivotal movement about a generally longitudinal and intermediate axis, and actuating means being provided for effecting tilting of the attachment about this axis so as to control the direction of force resulting from the venturi.

5. A surface vehicle as claimed in claim 4 wherein said actuating means comprises means for effecting rotation additional to, and in the same sense as, roll rotation of the vehicle about its longitudinal axis produced during turning of the vehicle.

6. A surface vehicle as claimed in claim 4 wherein the last-mentioned means comprises means for effecting rotation of the attachment in a direction opposite to roll rotation of the vehicle about its longitudinal axis produced during turning of the vehicle.

* * * * *